INVENTOR
MELBOURNE A. LIPP

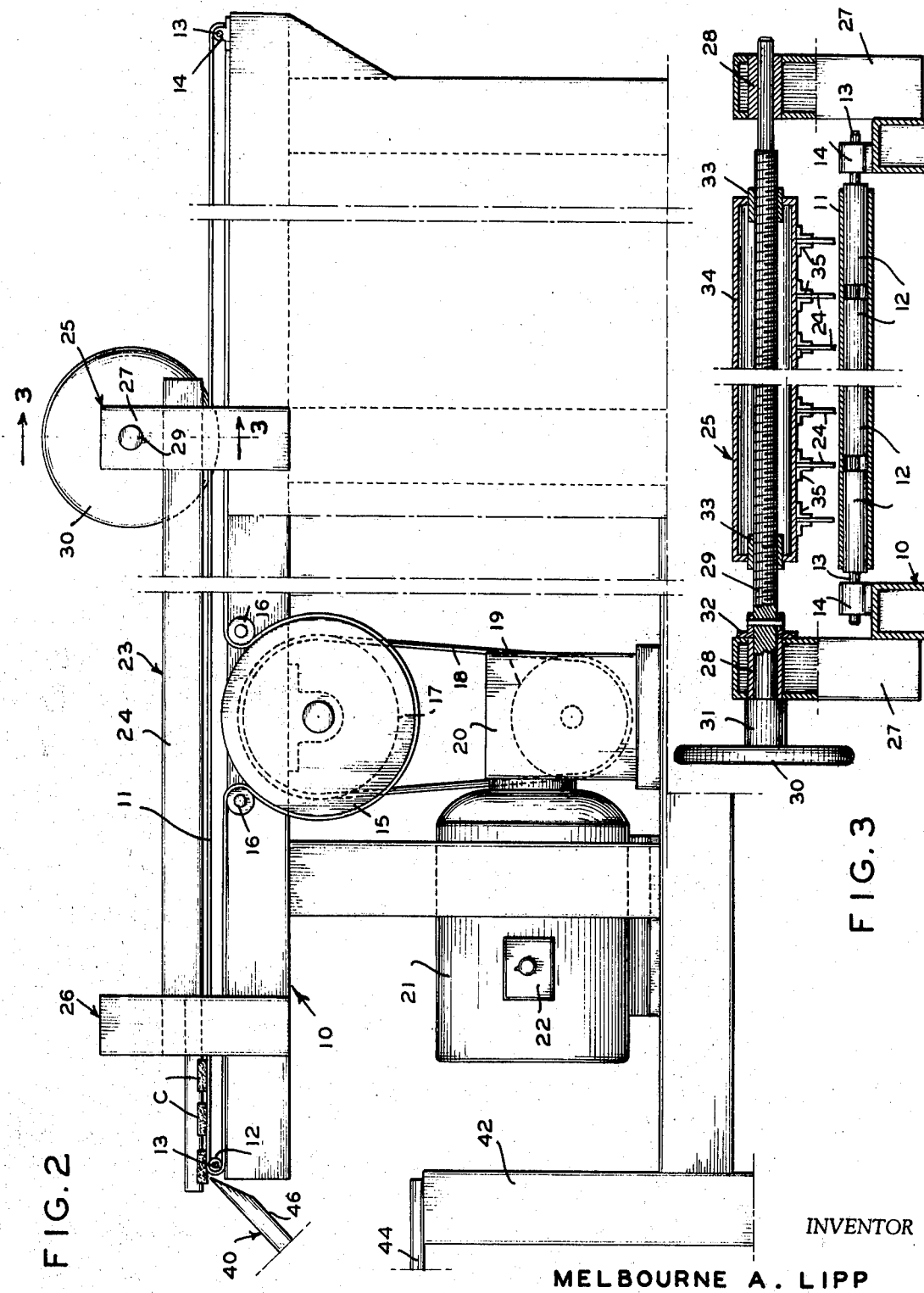

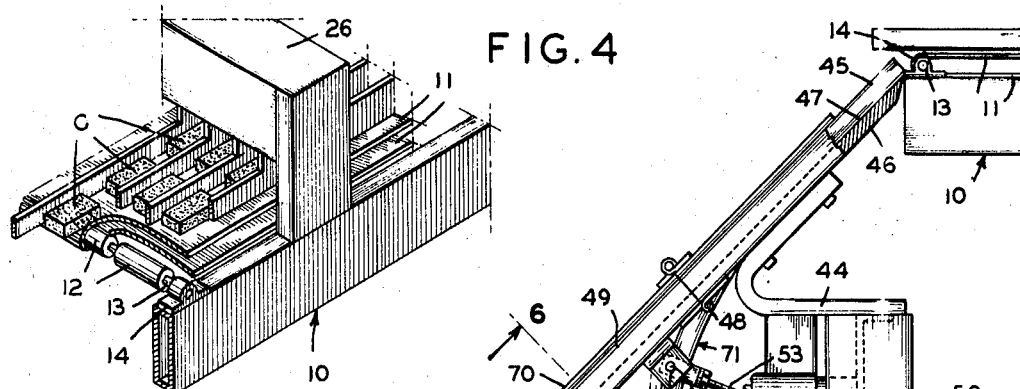
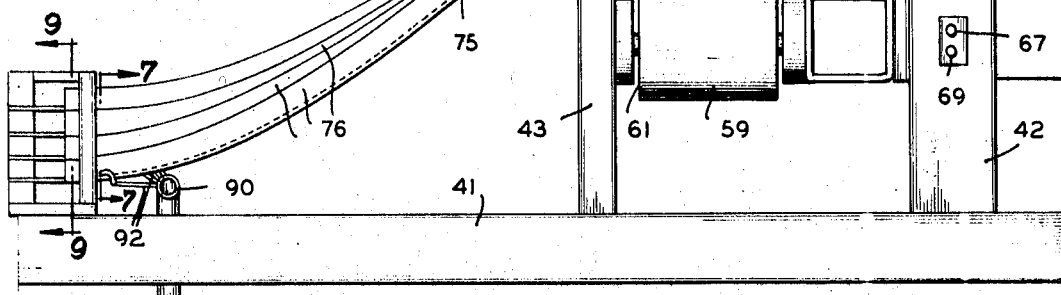
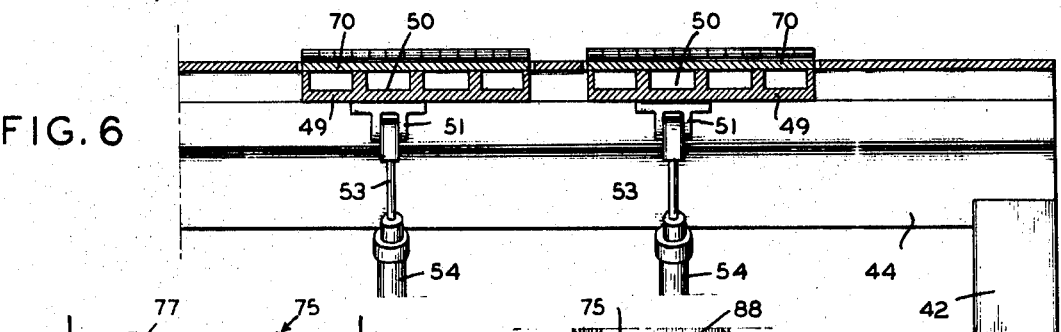
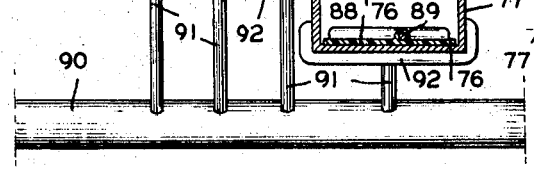

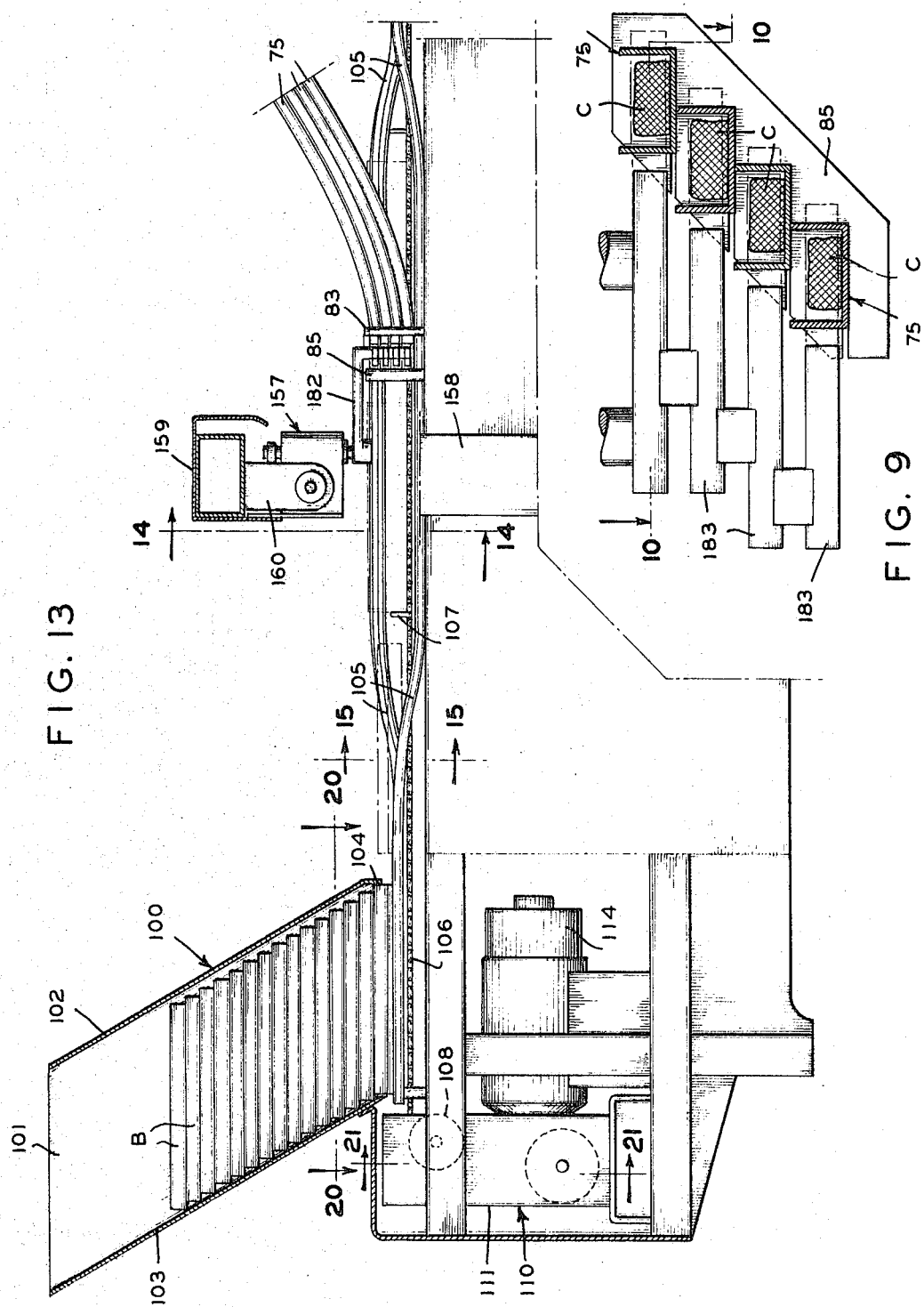

Feb. 2, 1971    M. A. LIPP    3,559,363
ARTICLE HANDLING AND PACKAGING APPARATUS
Filed May 31, 1968    11 Sheets-Sheet 5
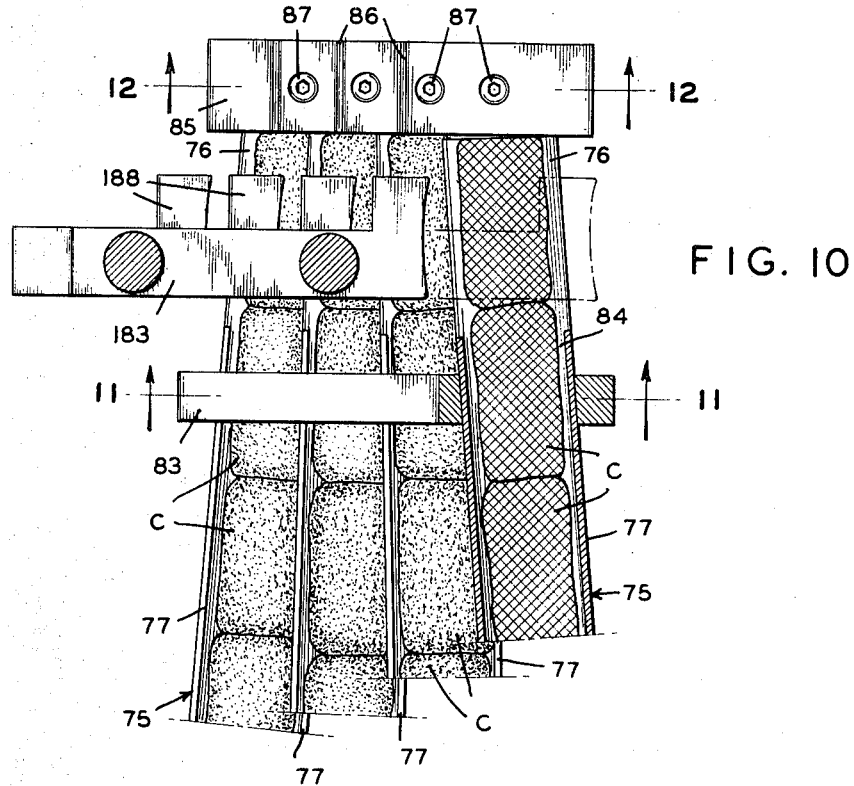
FIG. 10
FIG. 11
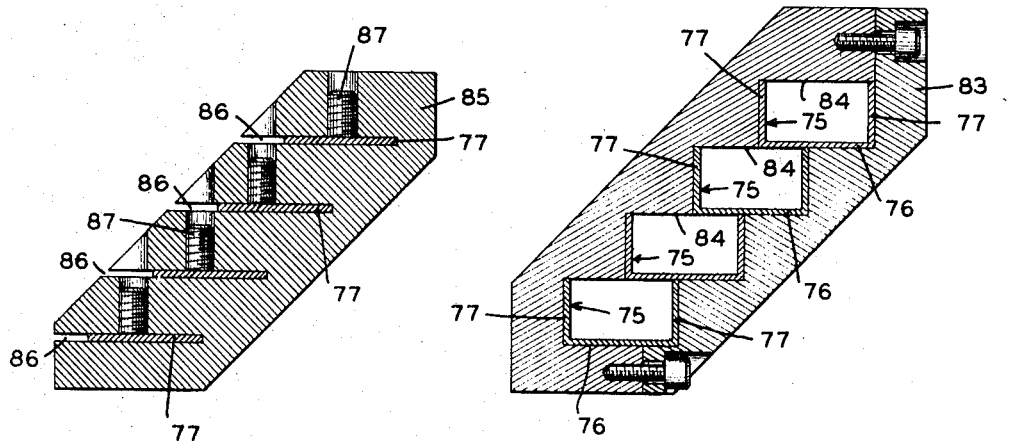
FIG. 12
INVENTOR
MELBOURNE A. LIPP
BY
ATTORNEYS

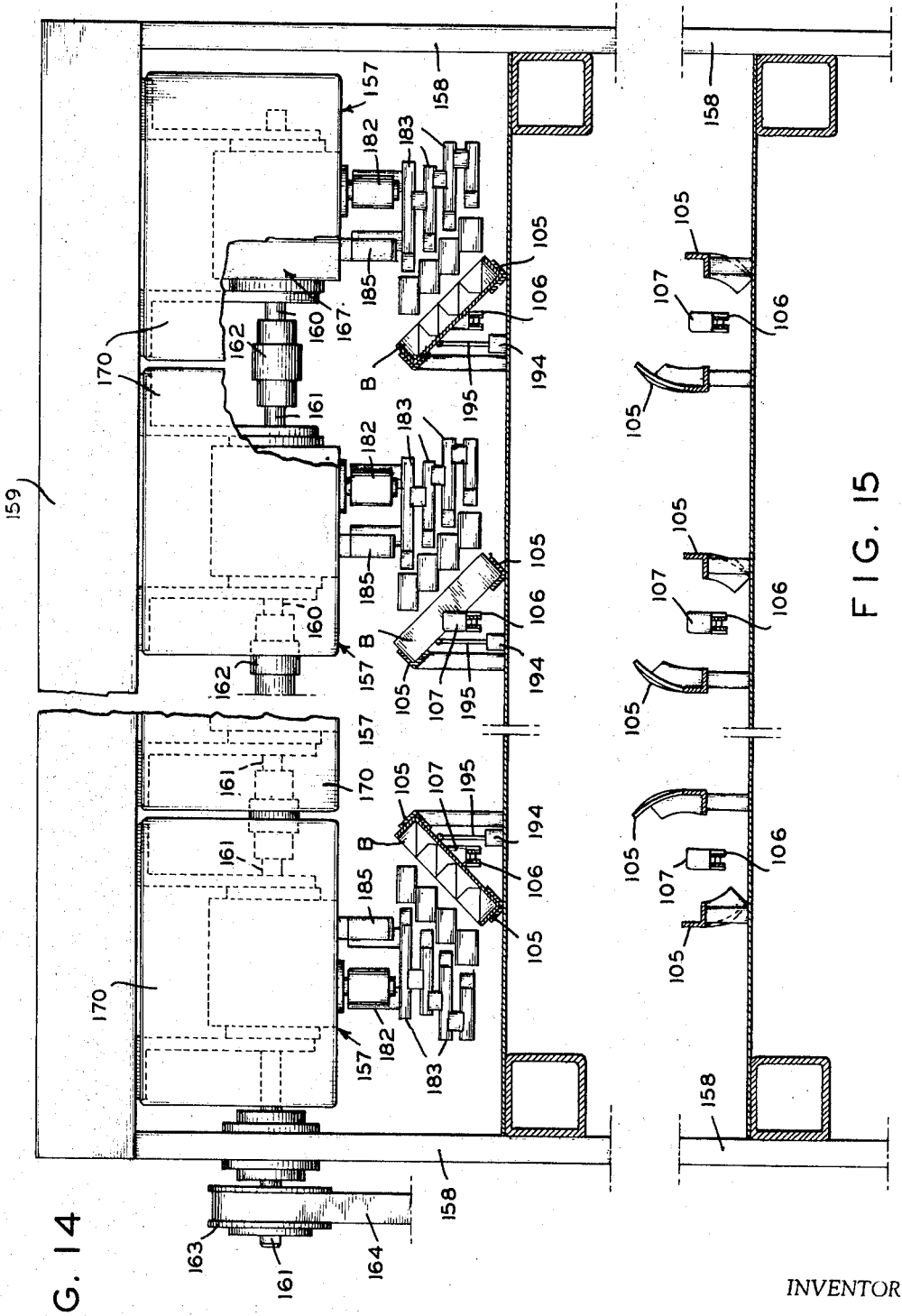

INVENTOR
MELBOURNE A. LIPP

ATTORNEYS

INVENTOR
MELBOURNE A. LIPP

ATTORNEYS

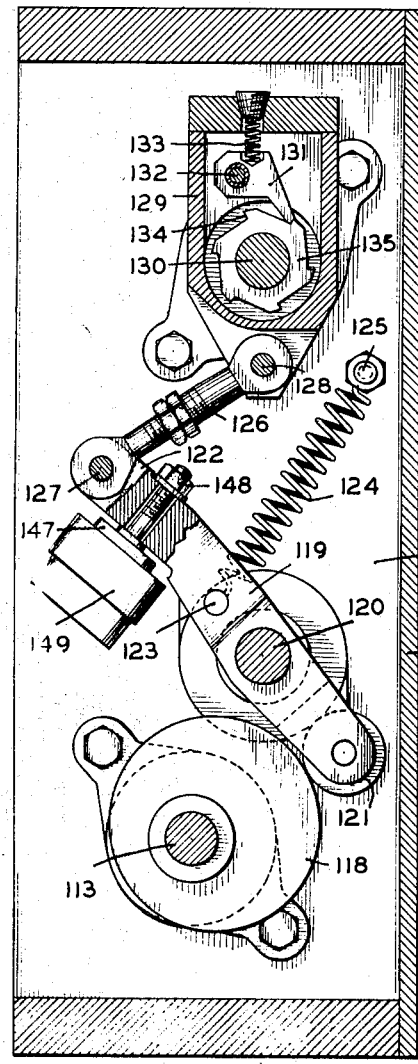

Feb. 2, 1971    M. A. LIPP    3,559,363
ARTICLE HANDLING AND PACKAGING APPARATUS
Filed May 31, 1968    11 Sheets-Sheet 10
FIG. 22
FIG. 21
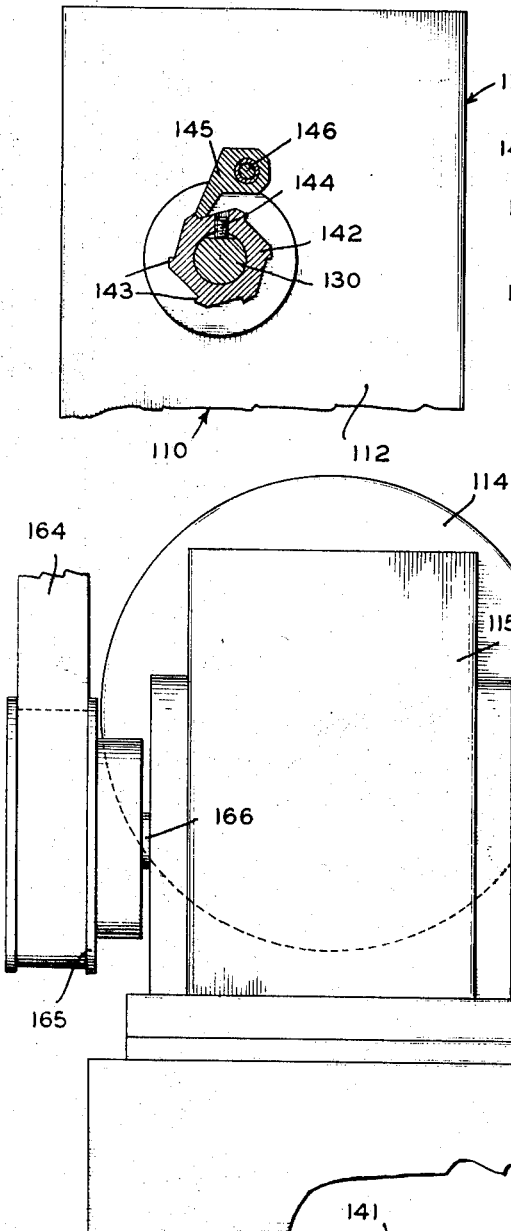
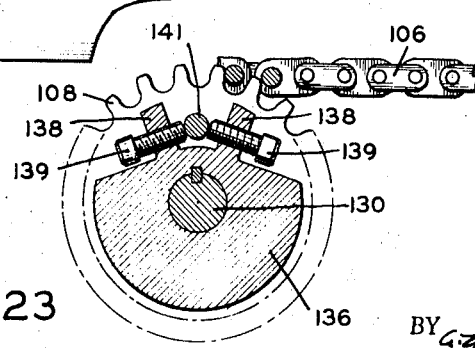
FIG. 23
INVENTOR
MELBOURNE A. LIPP
BY
ATTORNEYS

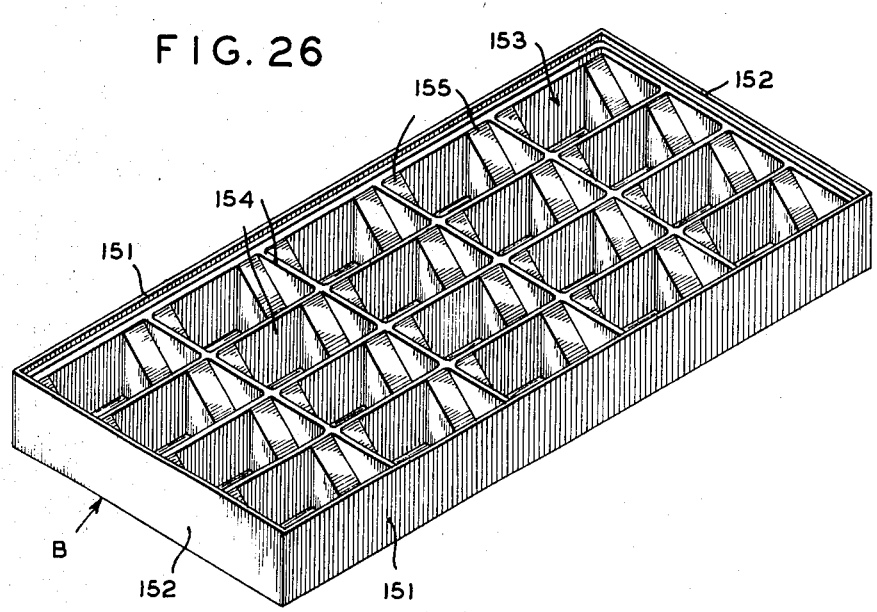
FIG. 26
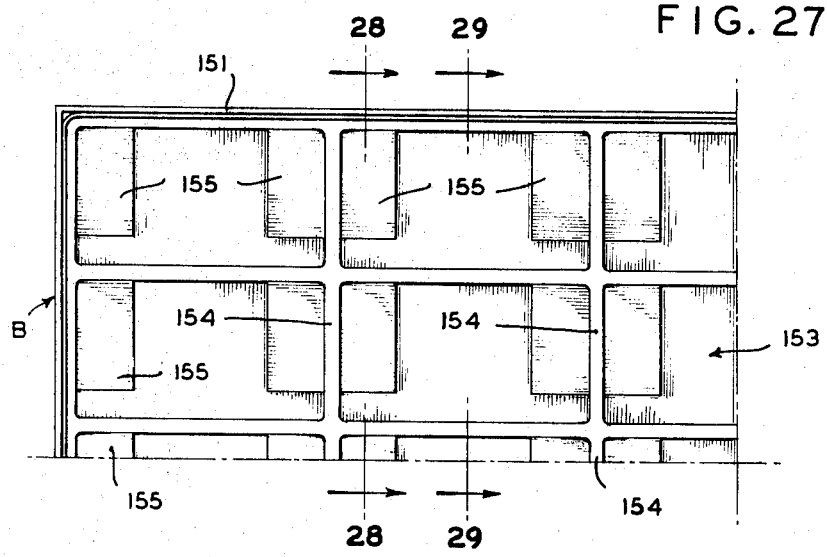
FIG. 27
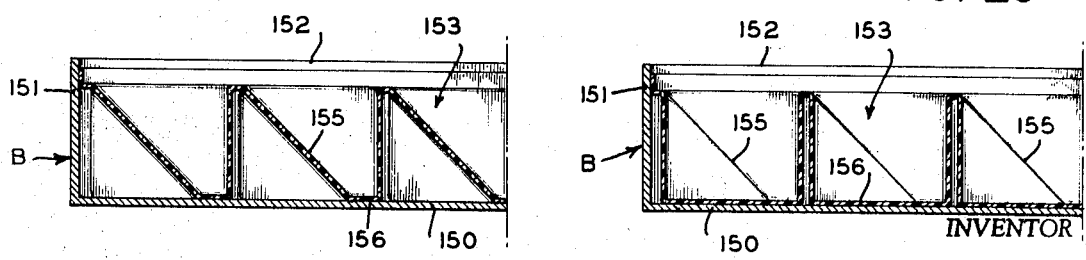
FIG. 28
FIG. 29
INVENTOR
MELBOURNE A. LIPP United States Patent Office 3,559,363
Patented Feb. 2, 1971

3,559,363
ARTICLE HANDLING AND PACKAGING
APPARATUS
Melbourne A. Lipp, Carmel, Calif., assignor to
L. S. Heath & Sons, Inc., Robinson, Ill.
Filed May 31, 1968, Ser. No. 733,523
Int. Cl. B65b 21/06
U.S. Cl. 53—26                                         27 Claims

ABSTRACT OF THE DISCLOSURE

Apparatus for separating relatively small individual articles into predetermined channels along a conveyor and discharging the same into an accumulator having multiple inclined chutes from which the articles are discharged into packages. At the discharge end of the accumulator the chutes are in stepped relation with each other with the discharge end of each chute being in a substantially horizontal plane and having generally parallel bottom walls, and the packages are disposed at a substantially corresponding angle and located closely adjacent to the discharge end of the chutes so that transfer mechanism can discharge the articles directly into the packages in a high speed operation and after the packages are filled they are discharged from the machine.

BACKGROUND OF THE INVENTION

(1) Field of the invention

This invention relates to the handling and packaging of articles and relates particularly to apparatus for directing, accumulating and packaging relatively small articles, such as candy chips or small bars, with such apparatus being particularly designed to handle a large volume of such articles with minimum personnel.

(2) Description of the prior art

Many devices have been provided for handling and packaging articles of various sizes; however, most of these devices have not been entirely satisfactory because they have been expensive to manufacture and maintain, have not been able to operate with sufficient speed to meet production quotas, have entailed a substantial amount of manual labor, and for other reasons have not been adaptable to solve the packaging problems which are inherent with products similar to the products packaged by the present device. In the present apparatus candy chips or small bars normally are coated with chocolate which has recently been applied and in some cases has not had an opportunity to thoroughly set and harden, and therefore has a tendency to adhere to anything it touches.

SUMMARY OF THE INVENTION

The apparatus of the present invention includes a conveyor which receives relatively large quantities of chocolate coated candy chips or bars which are placed on the conveyor in any desired manner, either manually or automatically. While on the conveyor the chips engage a plurality of guides which organize such chips into a series of lines and with a predetermined number of lines separated into groups so that multiple groups are provided, each of which forms part of a production line. From the conveyor the candy chips are discharged onto an inclined accumulator having a plurality of chutes down which the chips fall by gravity to a discharge end where they are subjected to a transfer mechanism which moves the chips laterally from the chutes. The transfer mechanism discharges the chips from the accumulator chutes into packages disposed adjacent to the discharge end of the accumulator chutes in such a manner that the individual chips are deposited within individual compartments of the package. The packages are advanced in intermittent steps timed to the movement of the transfer mechanism. Control means are provided to insure that the chips are in position to be discharged and that a package is in position to receive the chips being discharged from the accumulator.

It is an object of the invention to provide article and package transport systems with associated controls for placing large quantities of individual articles into separate compartments of the packages automatically in a minimum of time and which requires minimum maintenance and personnel.

Another object of the invention is to provide apparatus for transporting both articles and packages to a transfer station where the articles are automatically placed in the packages in a manner that a large number of packages can be filled within a given time and in which the capacity of the apparatus may be relatively easily enlarged or reduced by varying the number of production lines in operation and which accurately and positively transfers the articles into the boxes in timed relation, but which does not require critically timed supply of articles for such transferring.

BRIEF DESCRIPTION OF THE DRAWINGS

FIG. 2 is an enlarged side elevation of the infeed conveyor.

FIG. 3 is a fragmentary section on the line 3—3 of FIG. 2.

FIG. 4 is a fragmentary perspective of the discharge end of the infeed conveyor with portions broken away for clarity.

FIG. 5 is a side elevation of the accumulator portion of the invention.

FIG. 6 is a fragmentary section on the line 6—6 of FIG. 5.

FIG. 7 is an enlarged section on the line 7—7 of FIG. 5.

FIG. 8 is a fragmentary detail section on the line 8—8 of FIG. 7.

FIG. 9 is an enlarged detail section on the line 9—9 of FIG. 5.

FIG. 10 is a section on the line 10—10 of FIG. 9.

FIG. 11 is a section on the line 11—11 of FIG. 10.

FIG. 12 is a section on the line 12—12 of FIG. 10.

FIG. 13 is a side elevation of the box feed and article transfer portions of the invention.

FIG. 14 is a transverse section on the line 14—14 of FIG. 13.

FIG. 15 is a transverse section on the line 15—15 of FIG. 13.

FIG. 20 is an enlarged fragmentary section on the line 20—20 of FIG. 13.

FIG. 21 is an enlarged detail section on the line 21—21 of FIG. 13.

FIG. 22 is a section on the line 22—22 of FIG. 21.

FIG. 23 is a section on the line 23—23 of FIG. 21.

FIG. 24 is a section on the line 24—24 of FIG. 21.

FIG. 25 is a section similar to FIG. 24 illustrating the parts in different positions.

FIG. 26 is a perspective of one of the boxes.

FIG. 27 is an enlarged fragmentary top plan view of a portion of the box.

FIG. 28 is a detail section on the line 28—28 of FIG. 27.

FIG. 29 is a detail section on the line 29—29 of FIG. 27.

DESCRIPTION OF THE PREFERRED EMBODIMENT

General description

Figure 1:
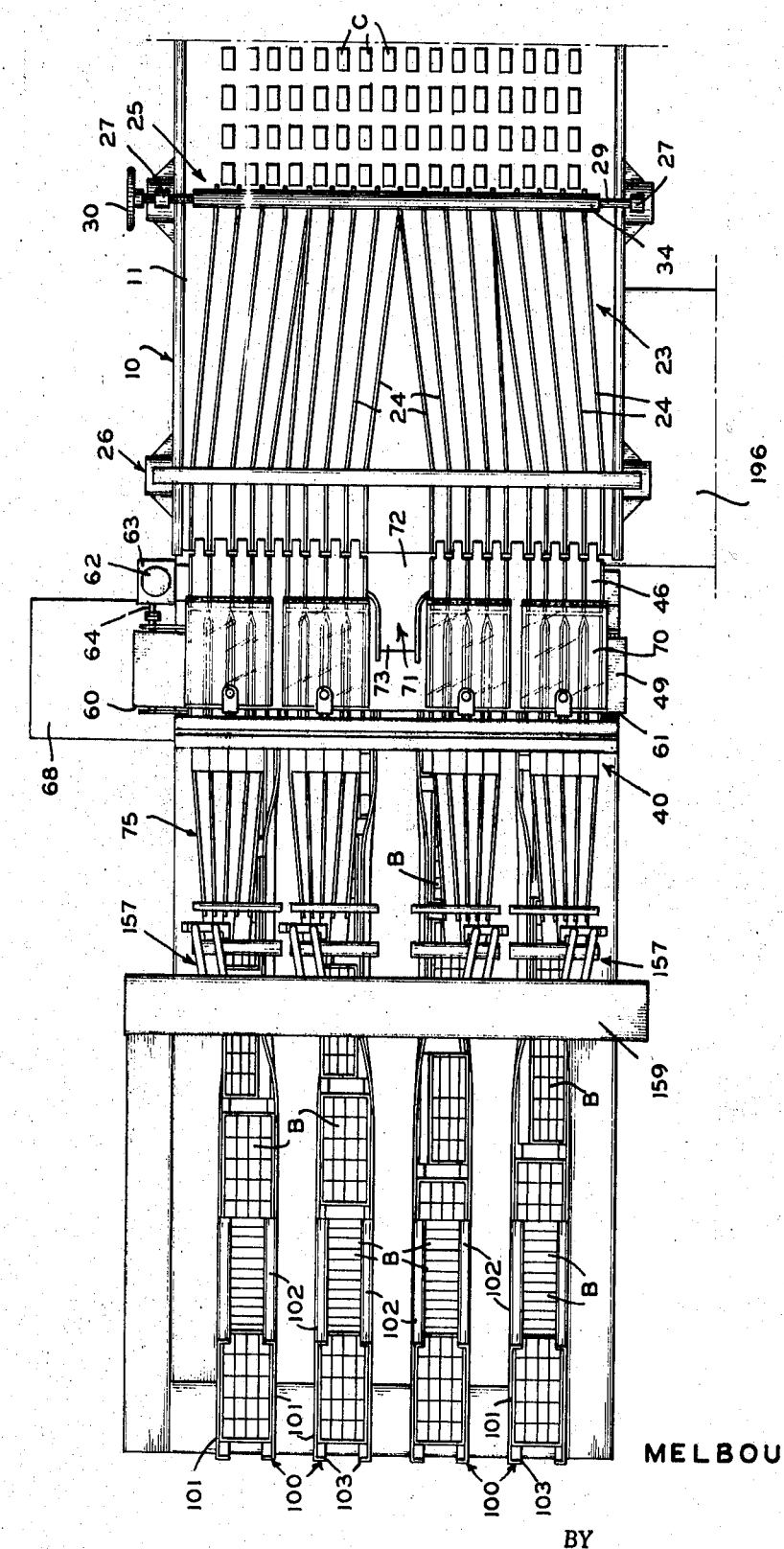
FIG. 1 is a top plan view illustrating one application of the invention.
Figure 16:
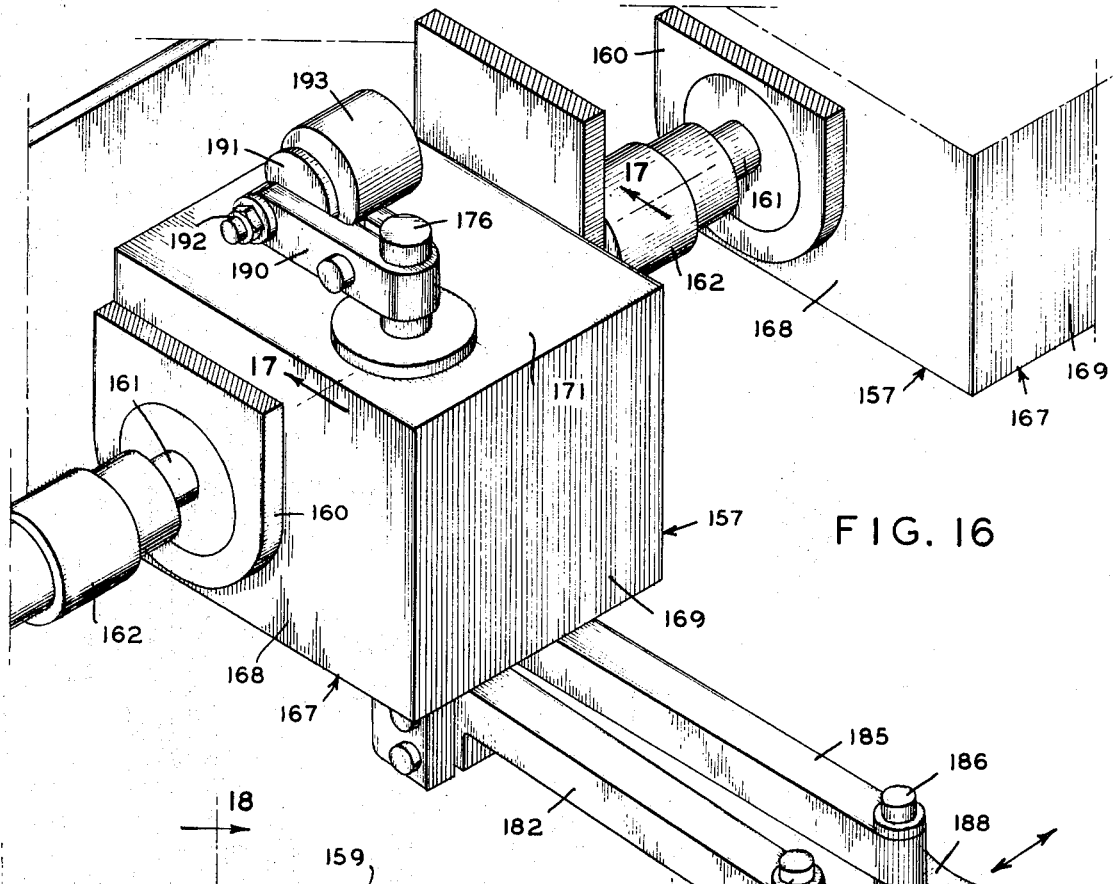
FIG. 16 is an enlarged perspective of one of the article transfer mechanisms.
Figure 17:
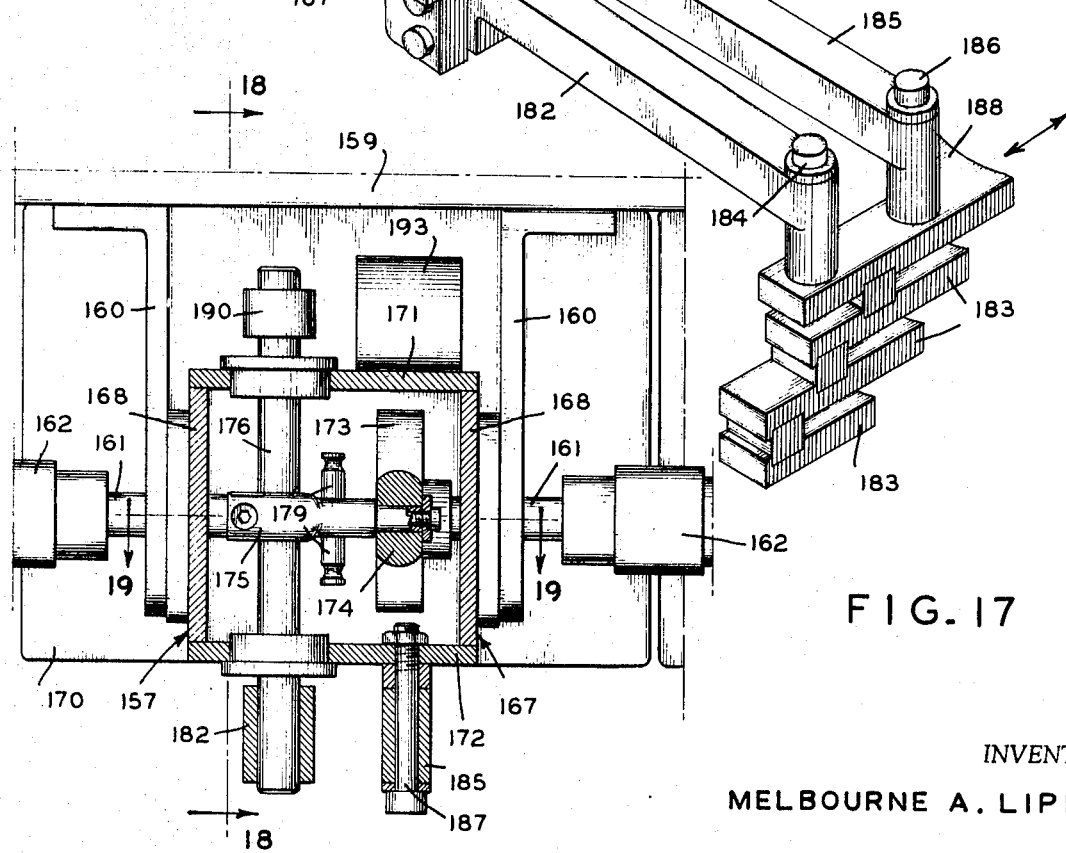
FIG. 17 is a section on the line 17—17 of FIG. 16.
Figure 19:
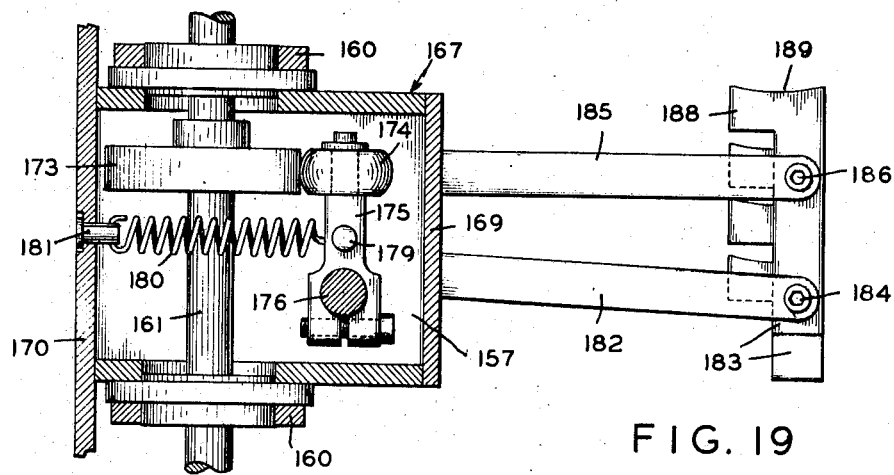
FIG. 19 is a section on the line 19—19 of FIG. 18.
Figure 18:
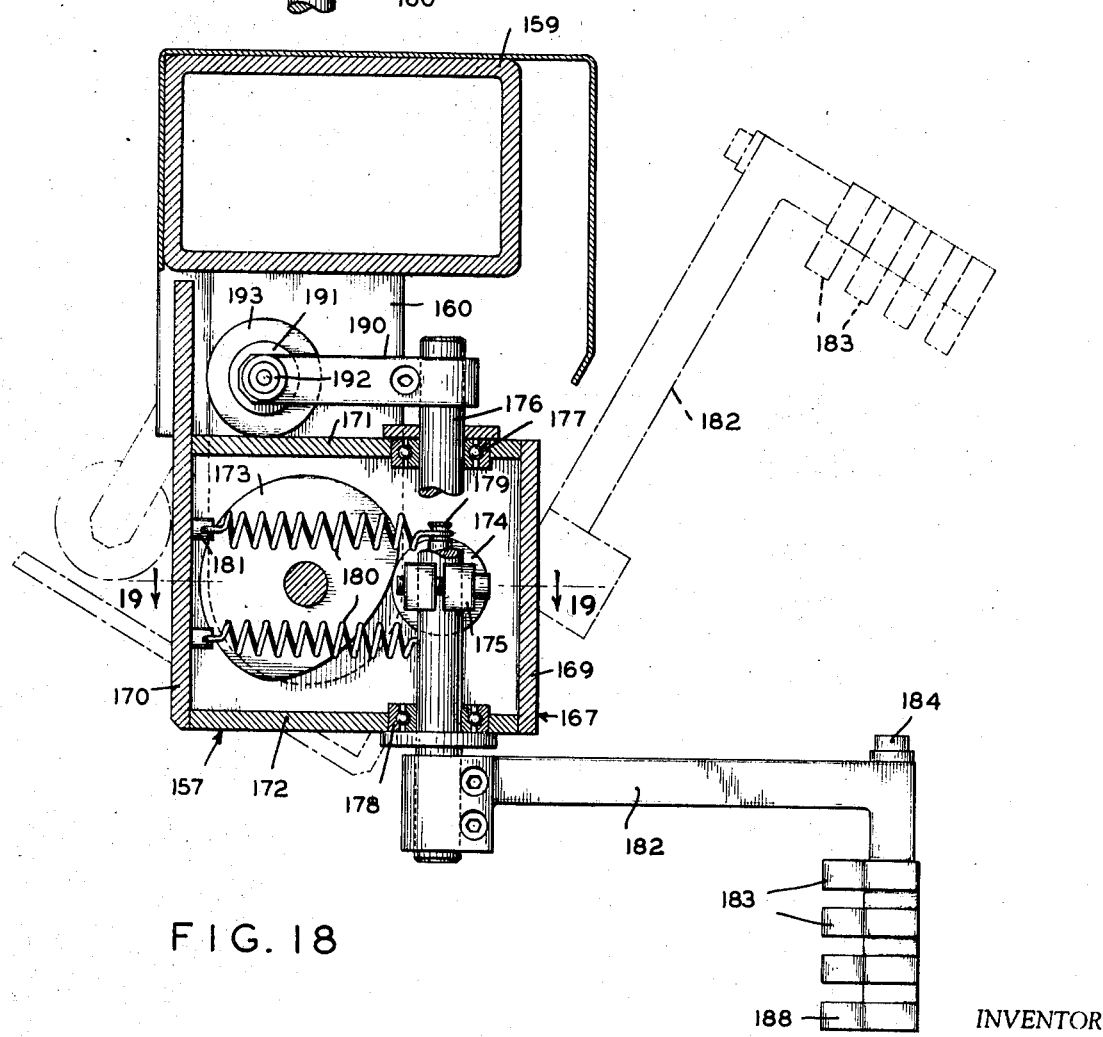
FIG. 18 is a section on the line 18—18 of FIG. 17.

Referring to the drawings, the article handling and packaging apparatus of the invention is designed to accommodate relatively small chocolate coated candy chips or bars of approximately 1⅝ to 2 inches in length and 1 to 1½ inches in width, with a rate of delivery in excess of 1,000 chips per minute. It has been found convenient to feed the chips into the apparatus in sixteen generally parallel lines with the lengthwise dimension of the chips disposed generally longitudinally of the direction of travel. The chips which are being fed into the apparatus normally are freshly made and the chocolate coating has not had an opportunity to thoroughly cool and set. In actual practice each of the chips or bars has a small flashing around the base caused by the chocolate coating having sagged slightly at the sides before setting.

The apparatus includes an infeed conveyor on which a multiplicity of chocolate covered candy chips or other articles are placed in any desired manner, either manually or automatically. As the conveyor moves the chips through the infeed portion, such chips are engaged by a plurality of guides supported just above the conveyor. At the input end the guides are equally spaced from each other and are adjustably mounted in a lateral direction relative to the conveyor. From the input end the guides separate the chips into groups with each group including a plurality of lines of chips so that at the discharge end of the guides a plurality of lines of chips are organized in a group and a series of groups are spaced from each other defining a predetermined number of production lines or runs. The number of groups and the number of lines in each group are determined by the package or container into which the chips are to be deposited. In the present instance it has been found convenient to provide four groups with each group having four lines of chips.

From the infeed conveyor the chips are discharged into an accumulator which includes a plurality of chutes down which the chips slide by gravity. The input portions of the chutes are generally in alignment with the lines of chips from the infeed conveyor and are adapted to receive the articles or chips therefrom. The upper portion of each of the chutes is inclined at a relatively steep angle that curves to a less steep angle at the discharge end. In order to discharge multiple chutes simultaneously and to maintain a constant width for each chute, the individual chutes of each group converge at the discharge end and are arranged in stepped overlapping relation with each other in a vertical direction. A stop is provided at the discharge end of each group of chutes and is located in a fixed predetermined position at a transfer or loading station of the apparatus. In the event of a back-up or jam of chips within the chutes, each group of chutes is provided with a dump gate which can be opened to divert subsequent chips onto a discharge conveyor to remove the unpackaged chips from the apparatus. A magazine containing a plurality of compartmented boxes or packages is disposed in alignment with each of the groups of chutes in the accumulator, and such boxes are removed from the magazine one at a time and are advanced by intermittent steps until they reach the transfer or loading station at the discharge end of the accumulator. As the containers approach the transfer or loading station, they are tilted to a position generally parallel with the stepped overlapping chutes and are disposed in close proximity thereto.

As illustrated the containers are divided into twenty compartments arranged in four lines with five compartments in each line. The boxes are advanced intermittently in timed relation so that a row of four compartments is located adjacent to the discharge end of the chutes of the accumulator at the transfer station. The transfer or chip feeder mechanism is located adjacent to the discharge end of the chutes and is driven in timed relation with the box advance mechanism so that as soon as a box stops moving the transfer mechanism is operated to remove a chip from each of the chutes and deposit such chips in compartments of the boxes. After the box has been filled it is moved onto a discharge conveyor which removes the filled boxes from the machine.

Infeed conveyor mechanism

With reference to FIGS. 2–4, the infeed conveyor mechanism includes a supporting frame 10 mounted on a floor or other structure and if desired could be mounted on wheels or rails for movement over the floor. A conveyor 11, of the endless belt type, extends substantially the full length of the frame 10 with upper and lower generally parallel runs. At each end of the frame 10, the conveyor is supported by a plurality of rollers 12 spaced along and rotatably carried by a shaft 13 having opposite ends mounted in brackets 14 on the frame 10. A drive roller 15 is mounted on the frame 10 and the lower run of the conveyor is directed into intimate driving engagement with such drive roller by guide rollers 16. In order to drive the roller 15 a sprocket or pulley 17 is mounted on one end of the same and such sprocket is driven by a chain or drive belt 18 which in turn is driven by a sprocket or pulley 19. The sprocket 19 is drivingly connected to a reduction gearing 20 driven by any suitable source of power, such as an electric motor 21. If desired, the motor 21 may be under the influence of a rheostat 22 or other speed control apparatus to vary the speed of the conveyor 11 in accordance with the speed of delivery of the articles to be packaged.

As illustrated in FIGS. 1, 2, and 4, a multiplicity of relatively small articles such as candy chips C are fed onto the conveyor 11 in any desired manner and are arranged in equally spaced generally parallel lines with the lengthwise dimension disposed longitudinally of the direction of travel of the conveyor. Although it is necessary that the chips be placed in generally parallel lines, the distance between chips in the same line is not critical as long as a sufficient supply is provided for each line.

As the conveyor 11 moves, it carries the chips from right to left, as illustrated in FIG. 1, into engagement with a guide mechanism 23. Such guide mechanism includes a plurality of guide members 24 which may be supported adjacent their front ends by a fixed bridge (not shown) or as illustrated in FIGS. 1–3 by an adjustable bridge 25 and supported adjacent their rear ends by a fixed bridge 26. The adjustable bridge 25 includes an upright post 27 at each side of the frame 10 and each of such posts is provided with a bushing or sleeve 28 with the sleeve of each post being in alignment with the sleeve of the other post. A lead screw 29, having an operating wheel 30 on one end is rotatably carried by the sleeves 28 and is prevented from moving transversely of the frame by a wheel hub 31 and a collar 32 fixed to the lead screw 29 on opposite sides of one of the posts 27. The lead screw is provided with external threads which threadedly engage sleeves 33 mounted on opposite ends of a generally tubular member 34, having a plurality of support members 35 connected to the bottom surface thereof.

The forward ends of the guide members 24 are fixed to the support members 35 so that when the operating wheel 30 is rotated, the tubular member 34 is moved toward one side or the other of the conveyor 11 depending upon the direction of rotation of the operating wheel. Movement of the tubular member 34 moves the ends of the guide members 24 so that the spaces between the guide members are aligned with the lines of chips C on the conveyor 11.

As the conveyor continues to move the chips lengthwise of the apparatus, the lines of chips engage the guide members 24 and are shifted laterally to follow such guide members. If desired the sides or contacting areas of the guide members 24 may be coated with a low friction material, such as "Teflon" or "Armalon," the latter a fiber glass material with "Teflon" impregnated therein, so that the chips slide easily along the guide members without marring the appearance of the chips or leaving a deposit of chocolate on the guide members. The guide members 24 separate the equally spaced line of chips into any desired number of groups or production lines with the guide members of each group being generally parallel with each other and at an angle to the guide members of the other groups. As illustrated in FIG. 1, it has been found convenient to separate the lines of chips into four equal groups.

At the discharge end of the conveyor 11 the chips C are discharged into the accumulator of the apparatus. Since the forward end of the accumulator should not engage the conveyor 11, it is necessary that at least the leading portion of the chips be separated from or raised slightly out of engagement with the conveyor so that the flashing along the base of each of the chips does not pass under the front edge of the accmulator and cause a jam. To separate the leading portion of the chips from the conveyor belt, the rollers 12 are of relatively small diameter so that as the conveyor 11 passes over such rollers the chips are cantilevered or the forward ends extend outwardly beyond the rollers and out of engagement with the belt. After the centers of gravity of the chips pass over the rollers, the leading edges of the chips will tilt downwardly and the chips will fall by gravity onto the front end of the accumulator. This action will impart an initial acceleration to the chips and assist in the passage of the chips through the accumulator.

Accumulator

With reference to FIGS. 5–12, an accumulator 40 is provided including a frame 41 having upright posts 42 and 43. The frame 41 may be mounted on the floor or, if desired, could be mounted on wheels or rails for movement over the floor. The upright posts 42 at each side of the apparatus are connected by a generally V-shaped brace 44, one leg of which is mounted on the upright posts and the other leg supports the upper or front end 45 of a plurality of plates 46. Each of the plates 46 has a series of channels 47 disposed in alignment with a line of chips being discharged from the conveyor 11. The lower front edge of the plates 46 is tapered so that the leading edge of the channels is disposed closely adjacent to the rollers 12 to permit the chips passing over such rollers to fall into the channels 47.

At the rear of the front end portion each of the plates 46 is connected by a hinge 48 to a dump gate 49 having a plurality of channels 50 disposed in alignment with the channels 47 of the plates 46. Each of the dump gates 49 has a lug means 51 on the bottom thereof which is connected by a pin 52 to one end of a piston rod 53 carried by a double acting fluid cylinder 54. The opposite end of the cylinder 54 is mounted on a bracket 55 carried by a support member 56 extending between the upright posts 42. The cylinder 54 is provided with fluid under pressure through fluid lines 57 and 58.

Beneath the dump gates 49 a dump conveyor belt 59 (FIGS. 1 and 5) is provided having a drive roller 60 and an idler roller 61 at opposite ends thereof. The drive roller 60 is rotated by any desired source of power, such as an electric motor 62, which drives a reduction gearing 63 having an output shaft 64 connected to the drive roller 60. If desired, guides 65 and 66 may be located along opposite sides of the belt 59 to retain chips thereon so that when an excessive amount of chips C build up within the accumulator 40, an operator can press a dump switch 67 (FIG. 5) to introduce fluid under pressure into the cylinder 54 through the fluid line 57. This causes the piston rod 53 to be retracted and lowers the dump gate 49 so that subsequent chips from the front end 45 will be discharged onto the dump belt 59 and carried laterally of the apparatus to a dump station 68. After the number of chips in the lower portion of the accumulator has been reduced, the operator can press a dump reset switch 69 to introduce fluid under pressure into the cylinder 54 through the fluid line 58 to move the piston 53 in the opposite direction and return the dump gate 49 to its initial position. If desired the dump gate 49 can be provided with a cover 70 or such dump gate can be left open. In the illustrated embodiment, an operator is located on each side of the apparatus and each operator controls two dump gates.

With reference to FIGS. 1 and 5, a discharge chute 71 is disposed along the longitudinal center of the apparatus and such chute has an upper portion 72 located between groups of plates 46 and has a lower portion 73 which curves downwardly to a position overlying the dump conveyor belt 59. In the event of a jam in the upper portion of the accumulator, the operator will manually remove the jammed chips and place them in the discharge chute where they will fall by gravity onto the dump conveyor.

After the chips C have passed through dump gates 49 they enter a series of individual chutes or channels 75 each of which has a bottom wall 76 connected to upstanding side walls 77. The upper portions of the chutes 75 are arranged in side by side relation and located closely adjacent to and in alignment with the channels 50 of the dump gates 49. Such upper portions of the chutes 75 are disposed at a steep angle relative to the horizontal plane of the apparatus and are supported by a brace 78 carried by the upright posts 43. The lower portions of the chutes 75 curve from a steep incline to a substantially flat portion generally parallel with the base of the apparatus.

If desired an automatic control for a purpose to be described later may be provided including a conduit 79 located across the tops of the chute 75 and a series of control elements or other sensing devices 80, one for each of the chutes 75, connected to the conduit 79. The control elements 80 may be of any desired type, such as a microswitch or the like or, as illustrated in FIG. 5, the control elements may include a photo-electric cell unit 81 mounted on top of each chute and a light source 82 (FIG. 5) disposed below each chute and in alignment with the photo-electric cell 81.

In order to discharge a candy chip from each of the chutes 75 of a given group, the chutes curve from a side-by-side relation at their upper ends to a stepped overlapping relation at their lower ends, as illustrated in FIGS. 5, 7 and 9–12. In this position the lower portions of the chutes are arranged in a line which is at an angle of approximately 45° from the horizontal, as indicated in FIGS. 7, 9, 11 and 12. Such lower portions are generally parallel with each other and horizontally disposed. Adjacent to the lower ends of the chutes, a support member 83 is provided having openings 84 through which the chutes 75 pass and which hold the chutes in fixed position. The lower ends of the chutes are connected and supported in assembled relation by an anchor member 85 having a plurality of slots 86 which receive the bottom walls 76 of each of the chutes and which are locked in fixed position by set screws 87. Between the support member 83 and the anchor member 85 the side walls 77 are removed so that the chutes 75 are open at both sides for the reception of transfer fingers which remove chips from the chutes as will be described later.

The chips C have a tendency to resist sliding downwardly through the accumulator by gravity, due to the adherent qualities of the semi-soft chocolate coating of the chips. Accordingly, the channels 47, 50 and 75 may have a coating of low friction material of any desired type to facilitate the sliding action. It has been found convenient to place a low friction tape 88 such as "Armalon," which is a fiberglass material having "Teflon" impregnated therein, along the channels. To further assist in the reduction of friction, a single strand wire 89 is imbedded within the "Armalon" tape 88, preferably in a serpentine path, so that the chip will gently rock from side to side as it travels through the channels and will normally have only two lines or points of contact. The wire is arranged so that the spacing of points of contact varies substantially across the entire width of the bottom of the chip to avoid the formation of a groove.

At the lower portion of the chute 75 the chips are stopped by the anchor member 85 in a position to be discharged. After the lowermost chip has been discharged, it is desirable to insure that the next succeeding chip is moved into position against the anchor member 85. To accomplish this a header or air line 90 supplied with air under pressure from any desired source (not shown) is disposed below the chutes 75 (FIGS. 5, 7 and 8). A bleeder line 91 extends upwardly from the air line 90 to an air discharge line 92 associated with each of the chutes 75. Each discharge line is disposed below one of the chutes and has its opposite ends curved upwardly and rearwardly along the side walls 77 and terminating in communication with an orifice 93 in each of such side walls. With this construction air under pressure from the air line 90 is discharged inwardly and rearwardly of each of the chutes 75 to force the chips against the anchor member 85. Air within line 90 may be discharged through lines 92 continuously or it may be discharged intermittently in timed relation with the transfer mechanism such that the air is discharged only after a chip has been removed and the transfer mechanism returned to its retracted position.

Box transporting system

With reference to FIGS. 13–15 and 20–25, a box transporting system is provided including a plurality of box magazines 100 of a size to accommodate a plurality of boxes B. Each of the magazines includes side walls 101 having inturned front and rear walls 102 and 103, respectively. For convenience and for assisting in the removing of one box at a time, the front and rear walls 102 and 103 are disposed at an angle in the direction of the longitudinal axis of the apparatus and the front walls 102 have a downwardly projecting lip 104 which permits one box at a time to be discharged from the magazine. Beneath each magazine a pair of angular rails 105 are spaced apart a distance slightly greater than the width of the boxes and receive the latter as they gravitate through the magazine 100.

In order to remove the boxes singly, an endless conveyor chain 106 having upstanding lugs 107 equally spaced therealong is provided between the rails 105. The chain is moved by a drive sprocket 108, the lugs 107 engaging the lowermost box and moving it along the rails 105. As each lowermost box is removed from the magazine, the remaining boxes gravitate downwardly so that the next succeeding box is in such position. The rails 105 are generally parallel with each other near each magazine 100; however, a short distance from the magazine one of the rails is twisted downwardly while the other rail is twisted upwardly, as illustrated in FIGS. 13, 14 and 15, so that the boxes B are inclined at an angle to the horizontal and substantially parallel with and closely adjacent to the discharge ends of the chutes 75 of the accumulator 40.

In order to drive the endless chains 106 a series of individually defeatable drive mechanisms 110 (FIGS. 21–25) are mounted on the frame 41 and each of such mechanisms includes a housing 111 having side walls 112. A common drive shaft 113 extends through the side walls 112 of each of the housings 111 and such drive shaft is continuously rotated by any suitable source of power, such as an electric motor 114 which drives a reduction gearing 115 having an output shaft 116 connected to the drive shaft 113 in any desired manner, as by a flexible coupling 117. Within each of the housings 111 an eccentric cam 118 is fixed on the drive shaft 113 so that when the drive shaft is rotated the cam likewise is rotated. A rocker arm 119 is swingably mounted intermediate its ends on a pivot 120 within the housing 111 and has a cam follower 121 at one end and a yoke 122 at the opposite end. To keep the follower 121 in engagement with the cam 118, a pair of pins 123 extend outwardly from opposite sides of the rocker arm 119 and receive one end of springs 124, the opposite ends of which are connected to anchor pins 125 attached to the side walls 112. The springs 124 are under relatively weak tension sufficient only to maintain the follower in contact with the cam.

At the other end of the rocker arm 119, an adjustable connecting rod 126 is pivotally secured at one end by a pin 127 to the yoke 122 while the opposite end of such connecting rod is pivotally secured by a pin 128 to a pawl housing 129 freely swingably mounted on a shaft 130 supported by the side walls 112. A pawl 131 is swingably mounted by a pin 132 within the housing 129 and is under downward tension from a spring 133. The free end of the pawl 131 is adapted to engage teeth 134 of a ratchet 135 fixed to the shaft 130. The shaft 130 extends outwardly of both of the side walls 112 and one end receives a hub 136 fixed thereon by a set screw 137. As illustrated in FIG. 23, the hub 136 has a pair of upstanding lugs 138 each of which threadedly receives an adjusting screw 139. The drive sprocket 108 is slidably mounted on a reduced portion 140 of the hub 136 and such drive sprocket is provided with an outwardly extending pin 141 received between the adjusting screws 139. By adjusting the screws 139 the relative positions between the drive sprocket 108 and the hub 136 can be adjusted so that the drive sprocket is in timed relation with the ratchet 135.

As the endless chain 106 of each production line moves the boxes B through the machine, a strain may be imparted to such chain which will tend to cause the chain to move backwardly slightly when tension on the chain is relieved as the pawl housing 129 is swung in the direction to disengage the pawl 131 from the ratchet 135. In order to prevent any backward movement of the chain 106, a second ratchet 142 having teeth 143 is mounted on the other end of the shaft 130 remote from the hub 136 and is fixed to such shaft in any desired manner, as by a set screw 144. A pawl 145 is freely pivotally mounted on a screw or other fastener 146 in a position so that the free end of the pawl will engage the teeth 143 of the ratchet 142 by gravity when the pawl 131 has moved the ratchet 135 one full step. It is noted that although the pawl 145 is illustrated as being movable by gravity, a spring or other resilient means could be connected to the pawl to urge such pawl into engagement with the ratchet 142.

As illustrated in FIG. 25, when the cam follower 121 is closest to the drive shaft 113, the pawl 131 is retracted. As the cam 118 is rotated by the drive shaft, the rocker arm 119 is pivoted about the pivot 120 and causes the yoke 122 to move from the right to the left, as illustrated in FIGS. 24 and 25, against the tension of the springs 124. Movement of the rocker arm rotates the pawl housing 129 in a clockwise direction so that the free end of the pawl 131 engages one of the teeth 134 of the ratchet 135 and rotates it and the shaft 130 which in turn rotates the drive sprocket 108. Simultaneously, when the shaft 130 is rotated, the second ratchet 142 also is rotated relative to the pawl 145 until such pawl passes the next succeeding tooth 143 and engages the same. When the cam follower 121 passes over the largest portion of the cam 118, the springs 124 retain the cam followr 121 in engagement with the cam 118 and causes the yoke 122 to move from the left to the right and pivot the pawl housing 129 in a counter-clockwise direction so that the pawl 131 passes over the next succeeding tooth 134 to a position to engage the same. During this return or cocking movement the ratchet 142 and the pawl 145 are holding the shaft 130 in fixed position so the chain 106 will retain the boxes B in fixed predetermined position.

In order to prevent movement of the chain 106 when chips are not in position to be transferred, a ferrous plate 147 is mounted on the rocker arm 119 in any desired manner, as by a fastener 148. An electro-magnet 149 is mounted on one of the side walls 112 in such a position that the ferrous plate 147 is substantially in engagement with the electro-magnet when the cam follower 121 is at the highest point of the cam 118. The electro-magnet 149 may be energized automatically by the control elements 80, or may be energized manually by a control switch (not shown) under the influence of the operator. If no chips are present within the channels 75 the sensing device 80 energizes the electro-magnet 149 which attracts the ferrous plate 147 and thus holds the rocker arm 119 in retracted position against the tension of the springs 124. In this manner the drive shaft 113 can continue to operate and the remaining drive mechanisms can continue to function while the mechanism with the energized electromagnet will not advance the chain.

Box construction

The boxes B (FIGS. 26–29) into which the chips C are to be placed, each includes a bottom wall 150, side walls 151 and end walls 152. A molded insert 153, of a size to fit snugly within the box B, is provided having a plurality of molded partitions 154 which divide the box into any desired number of compartments. The illustrated insert is molded to provide twenty compartments in four lines and five rows. A pair of angularly disposed portions 155 are located in each compartment, one at each end, and such portions extend downwardly from the top of one partition to the bottom 156 of the insert in spaced relation to the next partition.

The box B is adapted to be moved along the rails 105 by lugs 107 on chain 106 and tilted by the rails to a position such that the angular portions 155 are generally parallel with the horizontal plane of the apparatus and in alignment with the discharge ends of the chutes 75 so that the chips C can be transferred from the chutes 75 onto the angular portions 155 of the box.

Chip transfer mechanism

With reference to FIGS. 13, 14 and 16–19, a plurality of chip transfer mechanisms 157 are provided, one for each production line of the apparatus, for removing chips from the chutes 75 and placing such chips in the compartments of the box B. The transfer mechanisms are mounted on a frame which includes a pair of upstanding members 158 connected at their upper ends by a cross member 159. A plurality of pairs of downwardly extending support brackets 160 are mounted on the cross member 159 and provide journals for a plurality of shafts 161 connected together by flexible couplings 162 to provide a common drive shaft for a plurality of transfer mechanisms 157. In order to drive the common shaft a pulley 163 is fixed to one end of the shafts 161 and is driven by a belt 164 from a drive pulley 165 (FIG. 21) which is mounted on a shaft 166 driven by the reduction gearing 115. With this construction the drive mechanisms 110 and the chip transfer mechanisms 157 are driven in timed relation with each other.

Each of the transfer mechanisms 157 includes a housing 167 having side walls 168, front and rear walls 169 and 170, respectively, and top and bottom walls 171 and 172. Within the housing 167 an eccentric cam 173 is fixed to the shaft 161 so that when the shaft 161 is rotated the cam 173 likewise is rotated. A cam follower 174 is rotatably mounted on one end of a rocker arm 175, the opposite end of which is secured to a generally vertically disposed shaft 176 supported by bearings 177 and 178 carried by the top and bottom walls 171 and 172, respectively. The rocker arm 175 has a pair of pins 179 extending outwardly from the top and bottom surfaces thereof. The pins receive one end of a pair of springs 180, the opposite ends of which are connected to pins 181 carried by the rear wall 170. Springs 180 are relatively light and apply only enough tension to maintain the cam follower 174 in engagement with the cam 173.

The lower end of the vertical shaft 176 is disposed exteriorly of the housing 167 and to such lower end is secured one end of an arm 182 which extends forwardly a substantial distance from the housing 167. A plurality of vertically spaced fingers 183 are swingably connected by a pin 184 to the outer end of the arm 182. In order to provide a generally parallelogram movement to the fingers 183, a second arm 185 is arranged generally parallel with the arm 182 and swingably connected to the fingers 183 by a pin 186. The opposite end of the arm 185 is swingably mounted on a pivot pin 187 carried by the bottom wall 172 and the vertical axis of such pivot pin is in spaced generally parallel relation with the vertical axis of the shaft 176 so that when the shaft 176 is rotated by the cam 173 and the cam follower 174 the fingers 183 will be moved back and forth in a parallelogram action across the discharge ends of the chutes 75.

As illustrated, the fingers 183 are in fixed position relative to each other; however, it is contemplated that such fingers could be independently defeatable so that certain fingers of each transfer mechanism could discharge chips from the chutes 75 while other fingers would remain inactive.

Since there are four chutes 75 in spaced overlapping relation with each other in each group, four fingers 183 are provided which likewise are in spaced overlapping relation with each other an amount corresponding to the discharge ends of the chutes 75. If desired each of the fingers 183 may have an enlarged head portion 188 of a size slightly less than the length of one of the chips C and may have a curved contact surface 189 so that each head engages a chip adjacent to the front and rear thereof.

Each of the transfer mechanisms 157 is independently defeatable so that the transfer mechanism does not operate when no chips are present in one or more of the chutes 75. To accomplish this the upper end of the shaft 176 extends upwardly through the top wall 171 and receives one end of an arm 190 fixed thereto. The opposite end of the arm 190 has a ferrous plate 191 connected thereto by a fastener 192. An electro-magnet 193 is mounted on the top wall 171 and is connected to the control elements 80 and/or the operator's switch so that when no chips are present within one or more of the chutes 75 the electro-magnet 193 is energized and attracts the ferrous plate 191, thereby preventing the shaft 176 from rotating. When the electro-magnet is energized, the cam follower 174 does not follow the eccentric cam 173 and therefore the common shaft can continue to operate so that the remaining transfer mechanisms 157 continue in operation.

Also it is necessary to defeat the operation of the transfer mechanisms 157 when no box B is present and in position to receive chips from the accumulator 40. In order to do this a normally closed micro-switch 194 (FIG. 14) is mounted on the frame 41 below each pair of rails 105 at the transfer station and each micro-switch has a trigger 195 extending upwardly into the path of travel of the boxes. Each micro-switch is connected electrically to the electro-magnets 193 so that when the micro-switch is opened by the absence of a box at the transfer station, the electro-magnet 193 is energized to attract the ferrous plate 191 and prevent the rotation of the vertical shaft 176. As soon as a box has been advanced by the endless chain 106, the micro-switch 194 is closed and the electro-magnet 193 is de-energized so that the transfer mechanism 157 again is in operative condition for the fingers 183 to move the chips from the accumulator 40 to the boxes.

Operation

In the operation of the device, a plurality of chips C are placed on the conveyor 11 in any desired manner, either manually or automatically, and as the conveyor moves the chips along such chips will be directed into the guide mechanisms 23 which separate the lines of chips into groups as they are moved rearwardly through the apparatus. At the discharge end of the conveyor 11 the conveyor passes over the rollers 12 having a sharp radius over which the conveyor moves so that the leading edges of the chips extend out over the belt and out of engagement therewith. When the centers of gravity of the chips pass over the top of the rollers 12, the chips fall by gravity into the channels 47 of the accumulator and pass through the accumulator until they reach the discharge end of the chutes 75. Normally to insure that the chips feed by gravity to the discharge end of the chutes 75, a build-up of chips should be permitted along the chutes 75, at least a predetermined distance. In order to make certain that this occurs, the operator of the apparatus or the control elements 80 defeat the drive mechanisms 110 and the transfer mechanisms 157 so that no boxes are advanced and no chips are transferred from the chutes 75 until a predetermined number of chips are in each chute. In the event that the chips build up too rapidly in certain sections of the accumulator, the operator can press the dump switch 67 to energize the fluid cylinder 54 and move the dump gate 49 out of alignment with the chutes 75 and direct the chips in the upper part of the accumulator onto the dump conveyor belt 59 and move such chips to the dump station 68.

Simultaneously with the feeding of the chips into the accumulator, a plurality of boxes B are removed one at a time from the magazines 100 and advanced step by step until they are located adjacent to the discharge ends of the chutes 75. Such chutes are in stepped overlapping relation with each other so that a plurality of chips can be simultaneously and positively discharged into a corresponding number of compartments within the boxes, and during the movement of the boxes through the apparatus, such boxes are tilted at an angle substantially equal to the angular relationship of the chutes 75 and located closely adjacent thereto. When the chips and the boxes are in position, the transfer mechanism 157 is operated to cause the fingers 183 to move across the discharge end of the chutes 75 and engage the lowermost chips thereon and move such chips laterally into the compartments of the boxes B. As soon as the fingers are retracted the next succeeding chip is moved into discharge position and the endless chains 106 advance the boxes B one step. If desired the next succeeding chip can be advanced by gravity alone or can be assisted by air under pressure from the air line 90 through the orifices 93 in the side walls 77 of the chutes 75. The air line 90 can be operated either continuously or intermittently when the fingers 183 are retracted. As soon as a box has been filled, it continues to be advanced step by step until it is discharged onto discharge conveyor 196 (FIG. 1) which removes the filled boxes from the apparatus and carries them to another station for further processing such as placing tops on the boxes.

It will be obvious to one skilled in the art that various changes may be made in the described embodiment of the invention without departing from the spirit and scope thereof and therefore the invention is not limited by that which is illustrated in the drawings and described in the specification, but only as indicated in the accompanying claims.

What is claimed is:

1. Apparatus for handling and packaging discrete articles of non-uniform size comprising article accumulating means, said accumulating means including a group of chute means having receiving and discharge portions, said receiving portions being in side-by-side generally parallel relationship, said discharge portions of said chute means being in stepped relationship at different elevations, each of said chute means having a bottom wall disposed in generally parallel relationship with the bottom walls of other chute means in said group, container means having a plurality of rows of compartments, each row of compartments being movable to a position adjacent to and alignable with said chute means discharge portions, means for moving said container means into a position such that each row of compartments is momentarily adjacent to said chute means discharge portions, and means for moving articles from the discharge portion of each chute means into an adjacent row of compartments.

2. The apparatus of claim 1 in which said discharge portions are in stepped overlapping relation and at successively different elevations from one side to the other.

3. The apparatus of claim 2 in which the discharge portions of said chute means and the container moving means are substantially parallel and the article moving means moves the articles transversely from said chute means into said container means.

4. The apparatus of claim 1 in which the article moving means includes a plurality of fingers mounted in stacked relation one over the other and vertically spaced to correspond with the vertical spacing of the discharge portions of the chute means.

5. The apparatus of claim 1 in which the chute means has its receiving portion at a higher elevation than its discharge portion, the chute means having a relatively steep inclination adjacent to its receiving portion and a less steep inclination adjacent to its discharge portion, whereby articles may be moved by gravity from the receiving portion to the discharge portion and moved substantially horizontally from the discharge portion.

6. The apparatus of claim 5, said chute means having stop means at its discharge portion for positioning an article longitudinally of the chute means, said chute means having exit means adjacent to the stop means through which a positioned article may be discharged from the chute means.

7. The apparatus of claim 6 in which the exit means is an opening in one side of the chute, and the other side of the chute has an opening of a size to receive an article moving member.

8. The apparatus of claim 1 in which the article moving means comprises drive means, cam means driven by the drive means, cam follower means, and article pusher means operated by the cam follower means.

9. The apparatus of claim 8 in which there are a plurality of groups of chute means, common drive means for the article moving means, and means operative to inactivate each article moving means individually, said inactivating means comprising means selectively operative to retain the cam follower means in fixed position.

10. The apparatus of claim 1 including means for supporting a plurality of container means in stacked relation, conveyor means for said container means, said conveyor means comprising an endless drive, container engaging means mounted in spaced relation on said endless drive, said stack of container means supported adjacent to said endless drive, whereby the lowermost container means from each stack is engageable by the engaging means.

11. The apparatus of claim 10 in which a plurality of container means are positioned side-by-side, each having moving means carried by an endless drive, the endless drives being driven by a common drive means, and means operative to inactivate any of said endless drives individually and independently of the others.

12. The apparatus of claim 1 including rail means mounted adjacent to each container moving means and operative to tilt a container means laterally as it moves along the moving means during a portion of its travel and to cooperate with the moving means to support the container means in inclined position with the discharge portion of each chute means adjacent to its compartment.

13. The apparatus of claim 1, and means for driving the container moving means intermittently, whereby a row of compartments are intermittently stopped momentarily adjacent to the discharge portions of the chute means.

14. The apparatus of claim 1 in which the means for moving said container means and the means for moving the articles from the discharge portions of the chute means are connected in timed relation, whereby the article moving means is operative to move the articles from the discharge portions of the chute means into said compartments when said compartments are in position adjacent to the discharge portions of said chute means.

15. The apparatus of claim 1 in which said accumulating means has a separable section intermediate its receiving and discharge portions, said section being movable to divert articles from the chute means of said accumulating means, and means adjacent to the chute means for moving diverted articles to a remote location.

16. The apparatus of claim 1 including an anti-friction coating on each of said chute means to facilitate gravitational sliding action, and means providing an enlarged serpentine path within said coating to cause a rocking motion of the articles as they pass through said chute means.

17. The apparatus of claim 1 including means providing air under pressure to the discharge portions of said chute means for moving articles to a position to be discharged.

18. Apparatus for handling and packaging relatively small articles of non-uniform size comprising infeed conveyor means on which articles to be packaged are placed, means for driving said infeed conveyor means, guide means located above said infeed conveyor means for directing said articles into predetermined channels, an accumulator located adjacent to said infeed conveyor means and adapted to receive articles therefrom, said accumulator including a plurality of inclined chutes arranged in side-by-side relation at one end and in vertical stepped relation at the opposite end, each of said chutes having a bottom wall disposed in generally parallel relationship with the bottom walls of other chutes, a plurality of boxes carried by said apparatus, means for moving said boxes one at a time step-by-step, means for positioning said boxes closely adjacent to said stepped end of said accumulator, article transfer means for moving articles from said accumulator chutes into said boxes, and means for discharging said boxes from said apparatus.

19. The structure of claim 18 including control means for controlling said box moving mechanism and said article transfer mechanism when articles are absent from said chutes.

20. The structure of claim 18 in which a plurality of accumulators are arranged in side-by-side relation, a box moving means and an article transfer means associated with each of said accumulators, said box moving means being driven by a common shaft, each of said box moving means being individually defeatable so that certain box moving means may be inoperative while other box moving means driven by the same common shaft may be operative.

21. The structure of claim 20 in which said article transfer means are driven by a common shaft, each of said article transfer means being individually defeatable so that certain article transfer means may be inoperative while other article transfer means driven by the same common shaft may be operative.

22. The structure of claim 18 in which said accumulator includes dump gate means disposed across the path of travel of articles within said accumulator, means for selectively operating said dump gate means to discharge articles from said accumulator, and means below said dump gate means for discharging articles from said apparatus.

23. The structure of claim 22 in which said means for discharging articles from said apparatus includes dump conveyor means located beneath said dump gate means, and means for operating said dump conveyor means.

24. The structure of claim 18 in which said article transfer means includes a plurality of spaced offset fingers for simultaneously moving an article from each of said accumulator chutes.

25. The structure of claim 18 in which at least one end of said guide means is adjustable laterally of said infeed conveyor means.

26. The structure of claim 18 including means for elevating the leading portion of said articles above said infeed conveyor means when said articles are discharged from said infeed conveyor means onto said accumulator.

27. Apparatus for transferring articles of generally similar but non-uniform size from a first path of travel to a container moving in a second path of travel, said transfer apparatus including a housing, a first shaft rotatably mounted within said housing, means for rotating said first shaft, eccentric cam means fixed to said first shaft, a second shaft rotatably mounted within said housing and disposed at an angle to said first shaft, a first arm fixed to said second shaft within said housing, cam follower means rotatably mounted on said first arm, means urging said cam follower into engagement with said eccentric cam means and causing said second shaft to be swung back and forth when said eccentric cam means is rotated, a second arm mounted on said second shaft exteriorly of said housing, and pusher means mounted on said second arm, whereby rotation of said eccentric cam means will swing said second shaft about its axis and cause said pusher means to move back and forth to engage articles in the first path of travel and move said articles into a container in the second path of travel.

References Cited

UNITED STATES PATENTS 2,127,924  8/1938  Kimball et al. _____ 53—152
2,971,308  2/1961  Miskel et al. _____ 53—251X H. A. KILBY, JR., Primary Examiner U.S. Cl. X.R.

53—152, 251